United States Patent
Dellow et al.

(10) Patent No.: US 7,489,780 B2
(45) Date of Patent: Feb. 10, 2009

(54) SECURITY INTEGRATED CIRCUIT

(75) Inventors: Andrew Dellow, Glouchester (GB); Rodgrigo Cordero, Bristol (GB)

(73) Assignee: STMicroelectronics Limited, Bristol (GB)

( * ) Notice: Subject to any disclaimer, the term of this patent is extended or adjusted under 35 U.S.C. 154(b) by 1004 days.

(21) Appl. No.: 10/818,753

(22) Filed: Apr. 6, 2004

(65) Prior Publication Data

US 2005/0135616 A1 Jun. 23, 2005

(30) Foreign Application Priority Data

Apr. 7, 2003 (EP) .................................. 03252186

(51) Int. Cl.
*H04L 9/00* (2006.01)
(52) U.S. Cl. ..................... 380/239; 380/37; 380/201; 380/202; 380/210; 726/27; 705/51; 725/23; 725/31
(58) Field of Classification Search ............... 380/202, 380/210, 37, 201, 239; 705/51; 726/27; 725/23, 31
See application file for complete search history.

(56) References Cited

U.S. PATENT DOCUMENTS

| | | | | |
|---|---|---|---|---|
| 4,613,901 A | * | 9/1986 | Gilhousen et al. | 380/239 |
| 4,816,654 A | * | 3/1989 | Anderl et al. | 235/380 |
| 5,018,197 A | | 5/1991 | Jones et al. | 380/20 |
| 5,282,249 A | * | 1/1994 | Cohen et al. | 380/229 |
| 5,852,290 A | | 12/1998 | Chaney | 235/492 |
| 5,953,418 A | * | 9/1999 | Bock et al. | 380/240 |
| 6,157,719 A | | 12/2000 | Wasilewski et al. | |
| 6,219,422 B1 | * | 4/2001 | Sato | 380/240 |

FOREIGN PATENT DOCUMENTS

| WO | WO 00/59222 | 10/2000 |
|---|---|---|
| WO | WO 01/74071 A1 | 10/2001 |

OTHER PUBLICATIONS

Buer, M., et al., "Integrated Security for Digital Video Broadcast," *IEEE Transactions on Consumer Electronics* 42(3):500-503, Aug. 1996.
EBU Project Group B/CA, "Functional Model of a Conditional Access System," *EBU Technical Review*, No. 266, pp. 64-77, Winter 1995.

* cited by examiner

*Primary Examiner*—Kambiz Zand
*Assistant Examiner*—Tongoc Tran
(74) *Attorney, Agent, or Firm*—Lisa K. Jorgenson; Eric M. Ringer; Seed IP Law Group PLLC

(57) ABSTRACT

A semiconductor integrated circuit for the processing of conditional access television signals comprises an input interface for receiving encrypted television signals and an output interface for output of decrypted television signals. Control signals broadcast with the television signals include control words and common keys. Entitlement messages are received in encrypted form, encrypted according to a secret key unique to each semiconductor integrated circuit. The input interface is connected to a decryption circuit whereby the only manner of providing the common keys to the circuit are in encrypted form encrypted according to the secret key. Due to the monolithic nature of the circuit, no secrets are exposed and the system is secure. Alternatively, the entitlement messages are encrypted for decryption with the common keys and a unique ID stored in the circuit is compared with an ID in a received entitlement message. Only if the received and stored IDs match can the rights be stored and used.

21 Claims, 7 Drawing Sheets

SECURITY INTEGRATED CIRCUIT

BACKGROUND OF THE INVENTION

1. Field of the Invention

The present invention relates to an integrated circuit for processing received transmitted signals, in particular broadcast signals such as television.

2. Description of the Related Art

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-TV. In this context, broadcast can include over-air, via satellite, by cable or indeed any appropriate distribution medium in which the same signal content is sent to many recipients. Television signals may be analog signals or digital signals. The term "scrambling" is often used for the process of rendering analog signals unusable until "descrambled", whereas the terms "encryption" and "decryption" are more often used for digital signals. In either case, the aim is to only allow users that have paid a subscription to descramble/decrypt the signals.

A known system and receiver for processing received signals is described in EP 0,428,252 which is illustrated in FIG. 1 and which is incorporated herein by reference in its entirety. The concept in this system is to broadcast signals in the air (by satellite) which can be received by anyone, but only rendered usable by recipients having a "set top box" decoder 2 and an associated smart card 22. The decoders 2 of all recipients are identical, but the smart cards 22 contain unique secrets, including entitlements, which specify which channels within the broadcast signals the user is permitted to watch. The system operates broadly as follows:

A television signal is broadcast over air in a scrambled form and includes a stream of control data describing how the television signal is to be descrambled. The television signals and control data are necessarily the same signal sent to all users. It is not feasible to send the signals uniquely scrambled/encrypted to each recipient as there may be tens of millions of users and this would require tens of millions of times the bandwidth. Accordingly, all recipients must be able to operate the same descrambling/decryption process. This is implemented in the decoder 2 which receives the broadcast signals from a receiver 12. A data demodulator 14 extracts the portion of the signal for picture and/or sound and provides this to a descrambler 16 for descrambling. The control data portion is extracted and provided to a verifier 20 over line 15. The control data comprises encrypted control words which are needed to instruct the descrambler how to descramble the picture/sound signal. The control words must therefore be decrypted, and it is for this purpose that the smart card 22 is provided.

The verifier 20 provides encrypted control words across an interface along line 21 to the smart card 22. The smart card 22 contains an algorithm which, if the user is entitled to watch the chosen channel, decrypts the control words and provides them to the verifier 20 via line 23. The verifier passes the decrypted control words to a Pseudo Random Bit Sequence (PRBS) unit 18 which in turn provides a descrambling code to the descrambler. It should be noted that the control words and hence the descrambling code change frequently (every few seconds). The security in this arrangement is thus that it is not feasible to try and decrypt the control words in real time without the smart card algorithm. Also, in the event that the smart card algorithm is compromised, then the smart cards themselves can be re-issued to all subscribers. Lastly, to view any channels, a user must pay for "entitlements" which are broadcast over air addressed uniquely to each user and stored in the smart card 22.

A second published system is disclosed in a paper "Security and Addressability for Pay-TV" given at The Video Revolution Conference July 1982, University of Reading, which is incorporated herein by reference in its entirety. In this system, it is proposed that a monthly key is broadcast to each subscriber using each subscriber's unique unit key stored in a decoder. In turn the monthly key, which is common to all users of the system is used to decrypt a program key for decrypting a given television program.

BRIEF SUMMARY OF THE INVENTION

We have appreciated security problems with known conditional access broadcast techniques. In the existing smart card approach, the decrypted control words are available across an open interface between the smart card and decoder. These can be recorded and provided to other users by another communication channel (such as the Internet) and any recipient is thereby enabled to descramble the broadcast signal. Moreover, the communication between the set top box and the smart card could be altered to fraudulently store modified entitlements.

One embodiment of the present invention is directed to semiconductor integrated circuit for decryption of broadcast signals to produce decrypted broadcast signals. The integrated circuit includes:

an input interface for receipt of encrypted broadcast signals and encrypted control data;

an output interface for output of the decrypted broadcast signals;

a processing unit arranged to receive the encrypted broadcast signals from the input user interface, to decrypt the encrypted broadcast signals in accordance with control signals and to provide the decrypted broadcast signals to the output interface;

a decryption circuit arranged to receive the encrypted control signals from the input interface and to decrypt the control signals in accordance with a key from a key store;

an input arranged to receive an entitlement message from the input interface, the entitlement message comprising entitlement rights indicating the right of a user to receive the broadcast signals and a unique ID;

an ID store containing an ID for the circuit; and a comparison circuit arranged to compare the received ID with the stored ID and to cause the rights to be stored in a rights store only if the received ID and stored ID match; and wherein the circuit is arranged to inhibit production of the decrypted broadcast signals if the appropriate rights are not stored in the rights store.

A preferred embodiment of the invention has the advantage that no data is exposed, which could allow the security to be compromised.

BRIEF DESCRIPTION OF THE SEVERAL VIEWS OF THE DRAWINGS

An embodiment of the invention will now be described by way of example only with reference to the figures, in which.

DETAILED DESCRIPTION OF THE INVENTION

Figure 2:
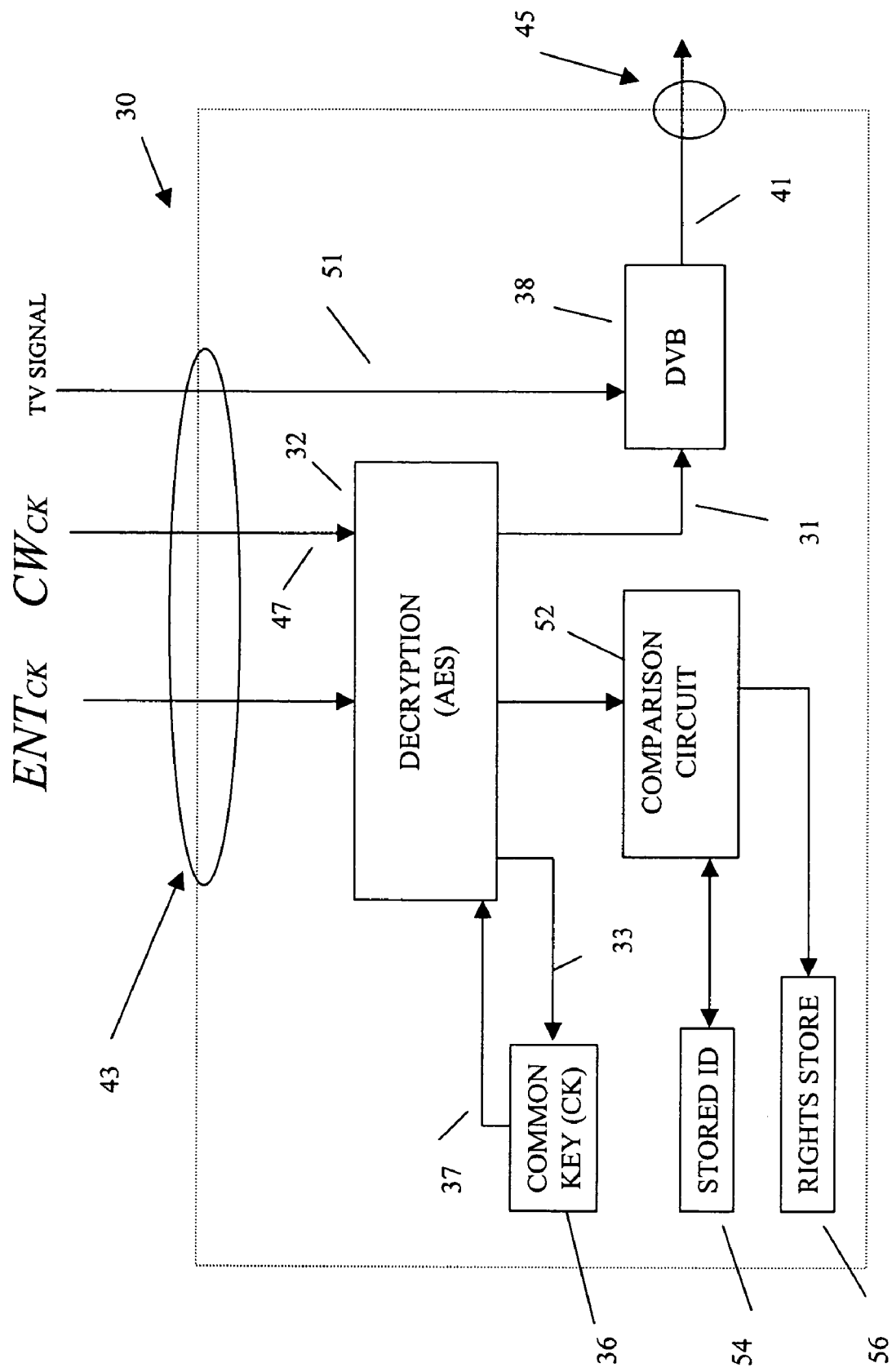
FIG. 2 shows the main functional components of a circuit according to a first embodiment of the invention.

A semiconductor integrated circuit 30 according to a first embodiment of the invention is shown in FIG. 2. In the embodiment, of importance is that the circuit 30 is a monolithic device in the sense that it is implemented as a single chip with the result that the internal bus connections shown are not available to exterior devices. It is not possible, therefore, for a hacker to compromise the security of the arrangement by simply reading the signals on any of the internal buses, or to write data, in particular viewing entitlements, without using the input interface. The only external connections are at input interface 43, which receives the broadcast signal and output interface 45 which provides the descrambled/decrypted output signal. The embodiment is primarily applicable to digital broadcast television signals (broadcast by any medium), but is equally applicable to any other digital broadcast signal where security is desired. The preferred embodiment is for the circuit 30 to be embodied in a so called set top box, but the circuit could equally be embodied in a television set or a smart card.

Figure 1:
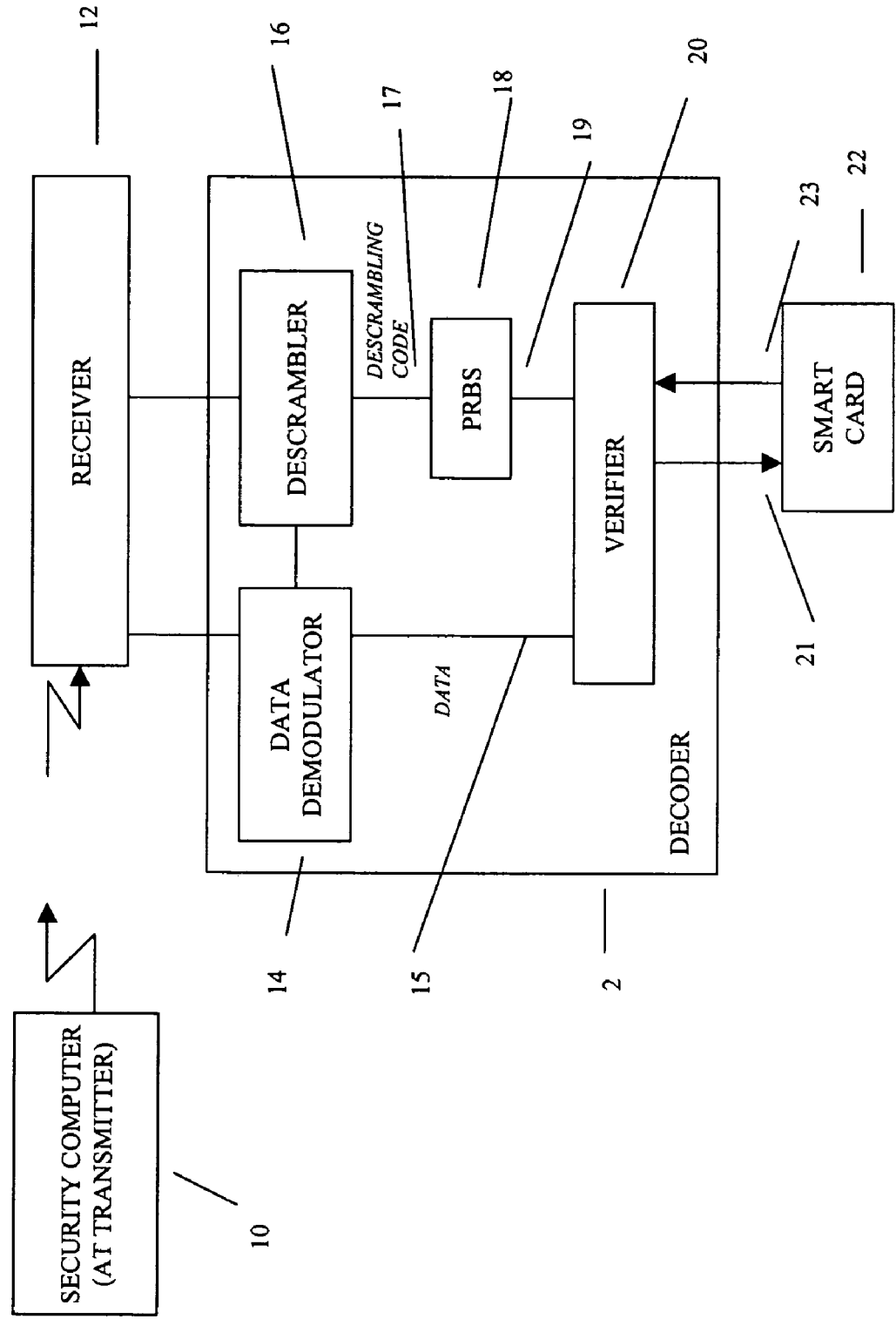
FIG. 1 shows a known receiver and decoder arrangement.

A digital television signal is received by a receiver (such as the receiver 12 of FIG. 1), processed according to how the signal was received (e.g. satellite, terrestrial, cable) and is demultiplexed (such as by the data demodulator 14 of FIG. 1) from data signals including a control channel. The resultant digital TV signal remains in encrypted form, and is provided to the circuit 30 at interface 43. The TV signal is necessarily encrypted according to an encryption/decryption scheme common to all authorized recipients. This is because there are likely to be millions of recipients, and to broadcast the TV signal using individual encryption schemes would require broadcasting the signal in millions of different encrypted forms simultaneously, and this is simply not feasible. The encrypted TV signal is provided to a Digital Video Broadcast (DVB) unit 38 on internal bus line 51, where it is decrypted in accordance with control data to produce a clear TV signal at output line 41 to output interface 45. The clear TV signal is a digital data stream that can be converted to picture and sound without further secret cryptographic techniques.

A fixed decryption scheme could be used using a key common to all users and all channels, however this would be insecure as if cracked once, the decryption would then be available to all. Accordingly, a changing encryption scheme is used in which an encrypted flow of control words (CW) are broadcast in the control-data, which require decryption to provide to the DVB Unit 38. The control words are also encrypted in a manner common to all authorized recipients, otherwise a unique flow of control words would need to be individual provided to each of the millions of recipients, which would again be non-feasible because of bandwidth. The control words are provided in encrypted form via input interface 43 and internal bus 47 to a decryption circuit 32, here an Advanced Encryption Standard (AES) circuit. The AES circuit 32 decrypts the control word data and provides it to the DVB unit 38 via internal bus 31.

The encryption scheme of the control word data flow is the same for all recipients (otherwise the control word data flow itself would differ for each recipient with the bandwidth problem noted above). A Common Key (CK) for the AES circuit 32 is therefore employed. The common key is stored in a common key store 36 and provided to the decryption circuit 32 over line 37. In this embodiment, it is not important how the common key is provided to the common key store. However, for preference, the common key is transmitted to each circuit 30 over air. We have appreciated a weakness in that, if the common key became known, then users may be able to share the common key (such as publishing on the Internet) allowing others to access received TV signals without paying. It is important that the entitlements, common key and decryption circuit are on the same monolithic device which in the present embodiment is a chip in the set top box. The monolithic device could, however, be on the smart card as described in relation to the prior art.

The circuit 30 is therefore arranged, so that, in addition to having the common key (CK), users must have rights to view given channels/programs by paying for those services. Those rights are broadcast for reception by the user as part of an entitlement message (ENT). The ENT message is encrypted according to the common key (CK) and includes the rights and a unique ID for the intended recipient. Each circuit 30 includes a unique ID stored in ID store 54. The received ENT message is decrypted in the AES circuit 32 and the received ID compared by a hardware comparison circuit 52 with the stored ID. Only if there is a match are the rights decrypted from the ENT message provided to a rights store 56. In addition, all or part of the circuit 30 can be disabled so that the output interface 45 will not output the clear TV signal unless there is a match between the received ID and the stored ID. The received ID could be sent in clear, but is preferably sent in encrypted form for decryption with a secret key (SK).

The security of the circuit 30 arises from the fact that, even if the common key (CK) became known, then it remains impossible to use the circuit to decrypt TV signals unless rights are provided to the circuit with the correct ID. Since the ID is a secret buried in the circuit 30, this hack is very unlikely. Even if the ID were found, this would only compromise the security of one circuit, and not others.

Figure 3:
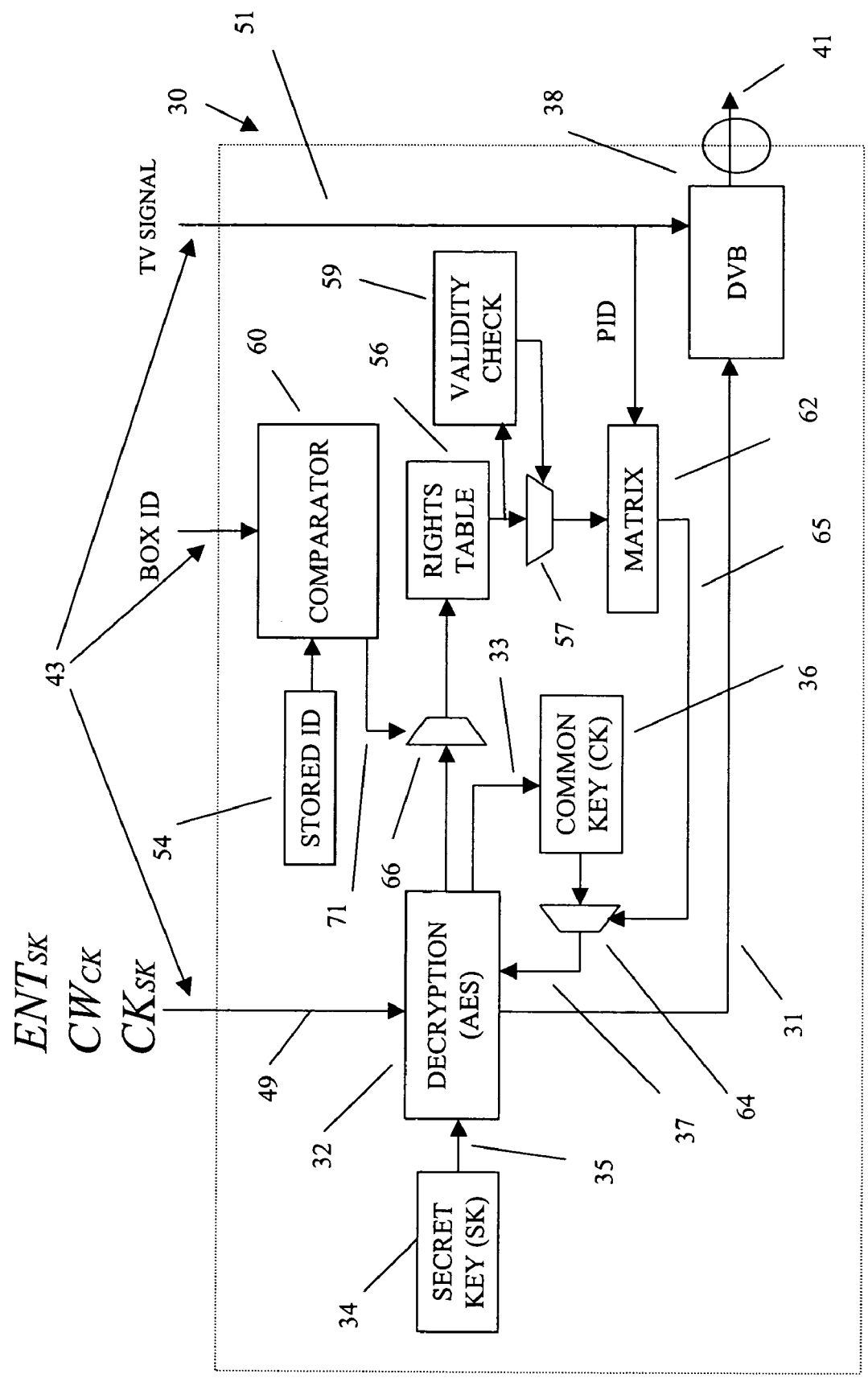
FIG. 3 shows the main functional components of a circuit according to a second embodiment of the invention.

A second, preferred, circuit embodying the invention and including additional security is shown in FIG. 3. In this embodiment like features are labeled with the same reference numerals as before and are as previously described. The addition to this circuit is a secret key store 34 containing a pre-stored secret key and the fact that the entitlement message is sent encrypted according to the secret key (SK). Also, the features which inhibit production of the decrypted signals are shown in greater detail. A comparator 60 and three gating components 57, 64, 66 are shown which inhibit production of decrypted broadcast signals if the entitlements do not correctly match the selected viewing channel.

The circuit operates as follows. A common key is distributed to each circuit 30 by broadcasting over air received in control data over line 49, encrypted according to the stored secret key (SK), received at the input interface 43. The common key (CK) is then decrypted using the stored secret key and stored in common key store 36 over line 33 and is subsequently used to decrypt the control signals also received on line 49 to produce control words (CW) on line 31. However, the common key is only provided back to the decryption unit 32 if a program ID of the currently selected channel and corresponding rights in the rights table 56 match as defined by a matrix 62. If such a match is found, then a line 65 is asserted to the gate 64 which is switched to allow the common key to be provided to the decryption circuit 32. If no match is found, the gate 64 is kept closed preventing supply of the common key and hence preventing production of the correct control words.

In contrast to the first embodiment, the entitlement messages which are sent addressed to each circuit are also encrypted according to the unique secret key of each user. In the stream of control data at interface 43 is a box ID which is specific to each circuit and an accompanying set of entitlements encrypted according to the secret key. The box ID is provided to comparator 60 and so is the box ID stored in the ID store 54. If the comparator shows that the box IDs match, then a signal is asserted on line 71 to instruct a gate 66 to allow the corresponding decrypted rights (entitlements) to be placed in the rights table 56 from the decryption circuit 32.

The box ID received by the input interface 43 could be sent in clear, but is preferably sent encrypted as part of the entitlement message. The circuit 30 may include an additional decryption circuit that receives the encrypted box ID from the input interface 43, decrypts the box ID, and supplies the decrypted box ID to the comparator 60 for comparison with the stored ID in the ID store 54. Alternatively, the decryption circuit 32 could instead be employed such that an output of the decryption circuit 32 is connected to an input of the comparator 60 in order to provide the decrypted box ID to the comparator.

An additional security mechanism is to include a validity check on the rights in the rights store 56 before releasing the rights to the matrix 62. This ensures that data cannot be placed in the rights store 56 which happens to match the format of genuine rights by random chance. A validity checker 59 receives the rights data provided from the rights store 56 and performs a validity check. This is preferably by performing a parity check on all or a subset of the bits in a rights data word, but other checks are possible such as checking that the rights data has a given prefix or suffix. If the validity checker confirms that the rights have a valid format, then the validity checker asserts a signal to gate 57, which permits the rights to be provided to matrix 62.

Alternatively, the validity checker 59 and gate 57 could be positioned between the gate 66 and the rights table 56 such that the entitlement rights are not placed in the rights table 56 until the validity checker 59 determines that the decrypted entitlement rights are valid. In addition, the rights table 56 could be dispensed with and the decrypted entitlement rights could be entered into the matrix 62 with or without being checked first by the validity checker 59 determines that the decrypted entitlement rights are valid.

Figure 4:
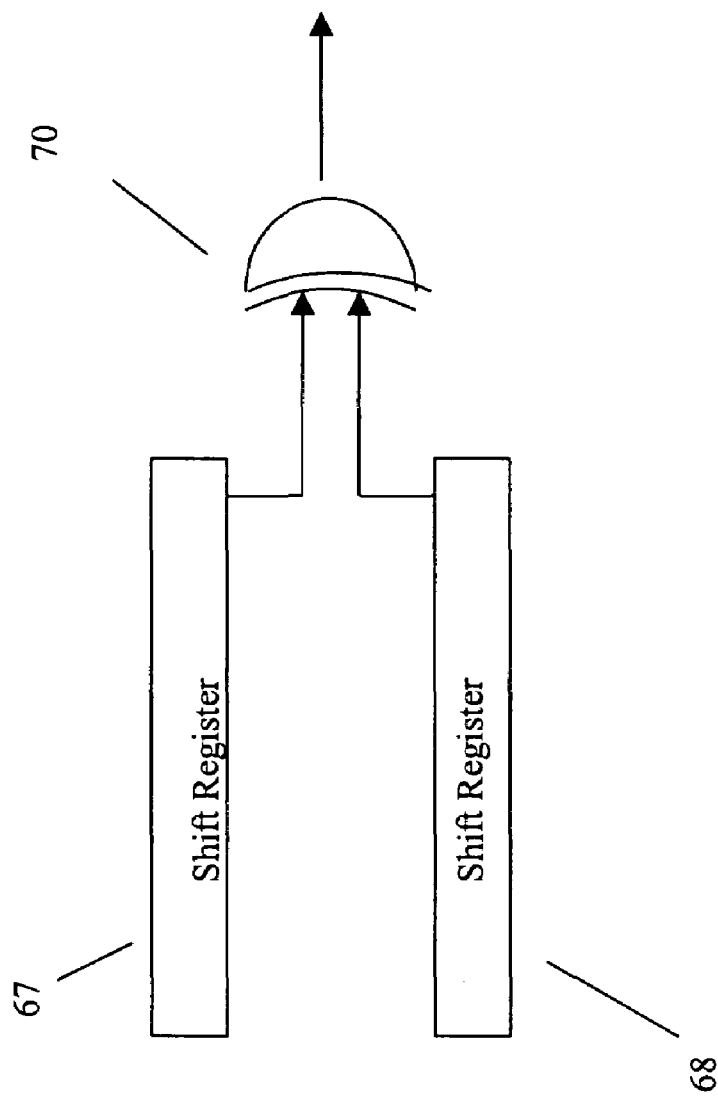
FIG. 4 shows in more detail a comparator of the circuit of FIG. 3.

The comparator is shown in further detail in FIG. 4. Many implementations of a digital comparator are known to the skilled person, the example in the present embodiment comprises a pair of shift registers 67,68 and an XOR tree 70. On receipt of a stream of entitlement messages, the box ID is shifted from the ID store to a first one of the pair of shift registers 67. In turn, the received IDs are clocked into the other of the two shift registers 68 and a bitwise comparison of the two performed by an XOR tree 70. If the IDs match exactly, then the XOR tree output is asserted causing the gating component to allow the corresponding entitlements received in the stream of entitlement messages to be decrypted and then stored in the entitlement rights store.

Returning to FIG. 3, the rights table 56 could have an ID for each channel. Alternatively, the rights table 56 stores levels of rights such as tier 1, 2, 3, etc., and the program ID (PID) received with the TV signal on line 51 identifies to the matrix 62 whether the program is one for which appropriate rights are stored. The matrix 62 can be a simple lookup table that compares the PID data in the received signal to the allowed tiers provided from the rights table 56 through the gate 57 to the matrix 62.

The rights table 56 and matrix 62 can also be arranged to permit or deny one of a plurality of common keys to be retrieved from the common key store. For example, different categories of common key could apply to corresponding categories of rights level as defined by a common bit sequence in a group of common keys. A given rights level could allow access to only a subset of a plurality of common keys having, for example, the same last N bits.

The additional security in the second embodiment over the first embodiment is thus that, even if the box ID is known (this could be provided to each user with the decoder containing circuit 30), it remains impossible to provide rights to the rights store 56, for use in determining whether access to a given program/channel is allowed, without knowing the secret key (SK). This is because the only route to the rights store 56 is through decryption circuit 32.

Figure 5:
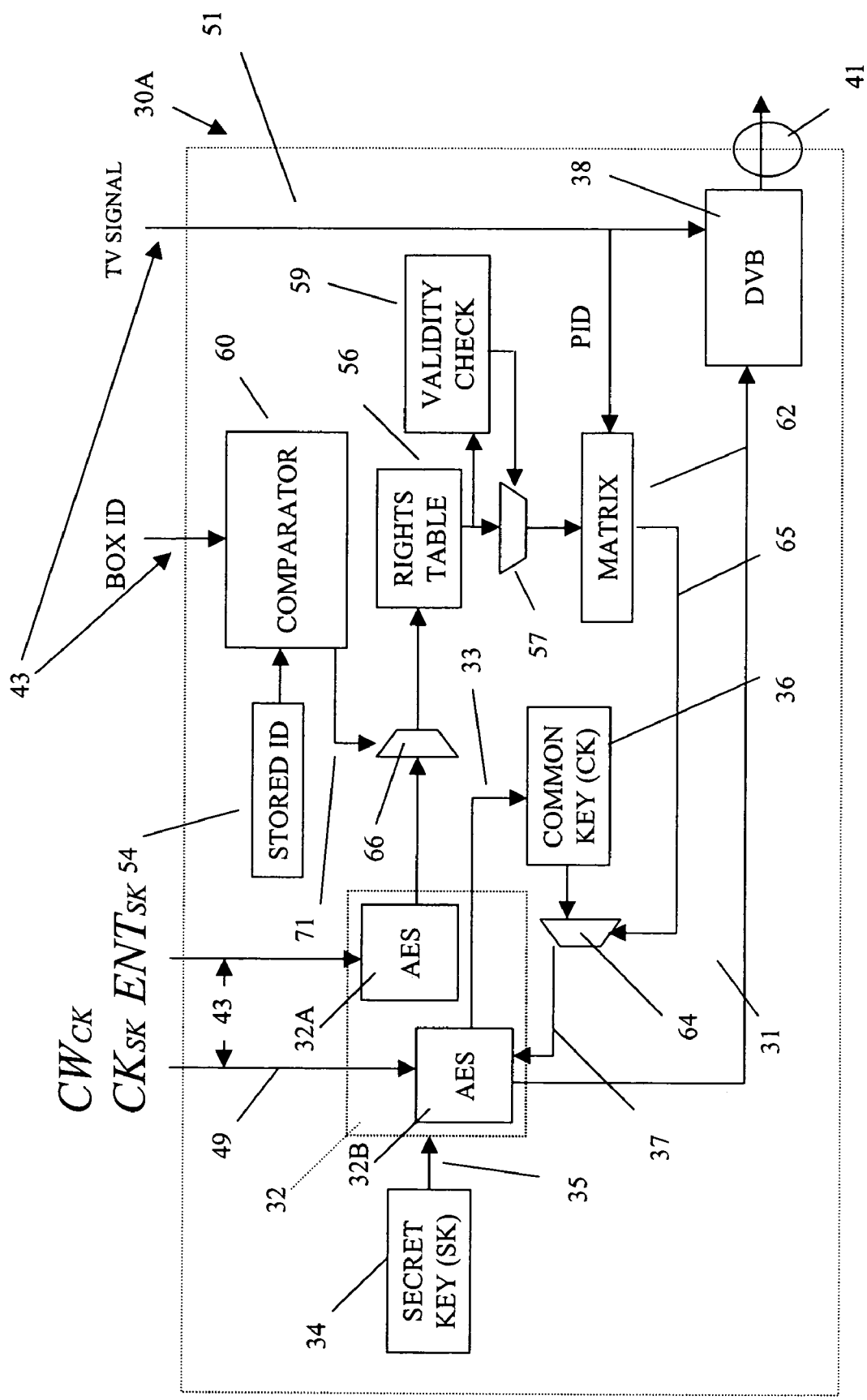
FIG. 5 shows main function components of a circuit according to a third embodiment of the invention.

Although shown as a single decryption circuit 32 in FIGS. 2-3, two or more such circuits could be provided, one for CW decryption, another for CK decryption, one for entitlement decryption, and one for box ID decryption. For example, FIG. 5 shows an embodiment 30A that is substantially identical to that of FIG. 3 except that the decryption circuit 32 includes a first decryption circuit 32A arranged to decrypt the entitlement message and a second decryption circuit 32B arranged to decrypt the control signals. Of course, more than one secret key could also be used in each circuit and such modifications are within the scope of the invention.

Figure 6:
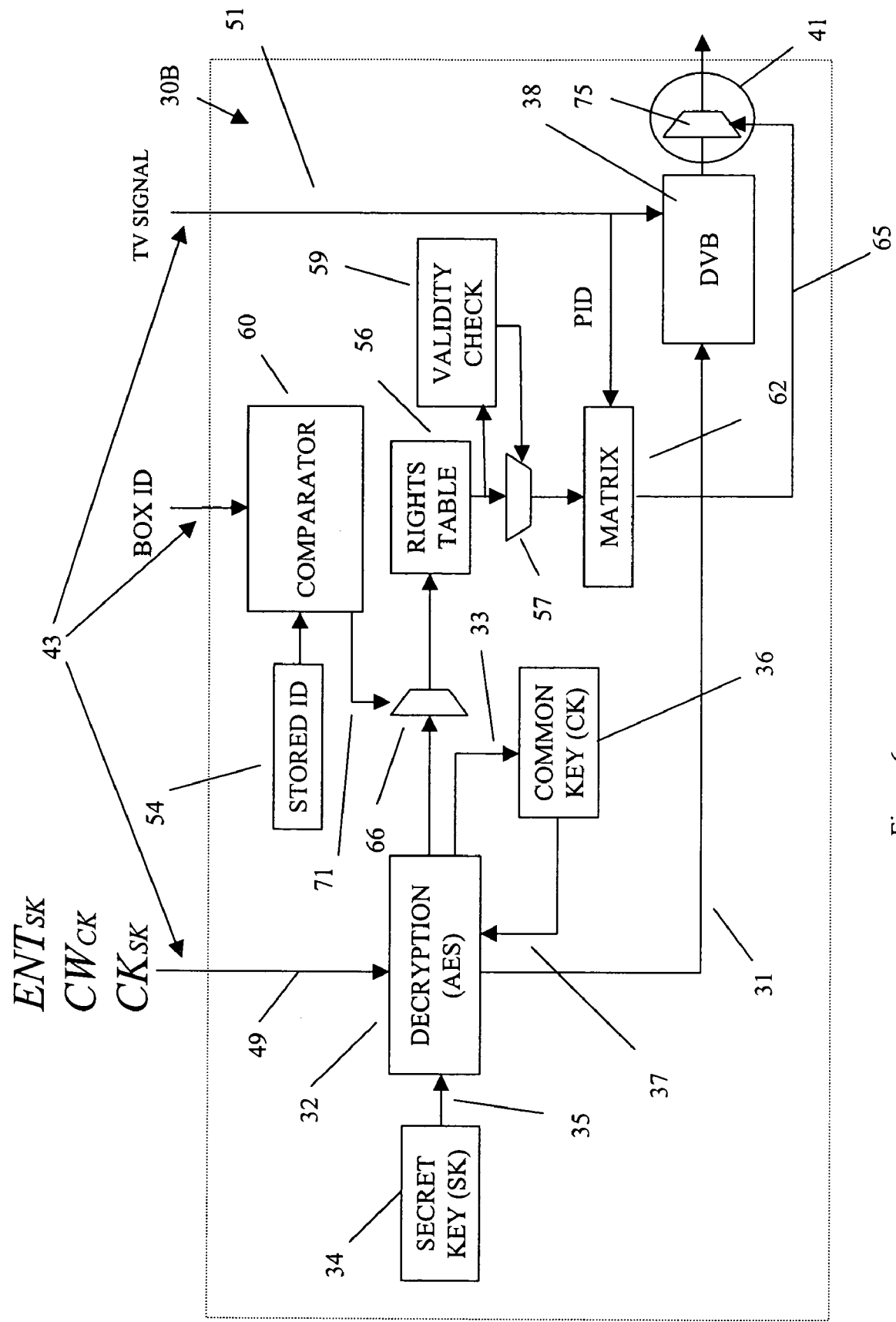
FIG. 6 shows main function components of a circuit according to a fourth embodiment of the invention.
Figure 7:
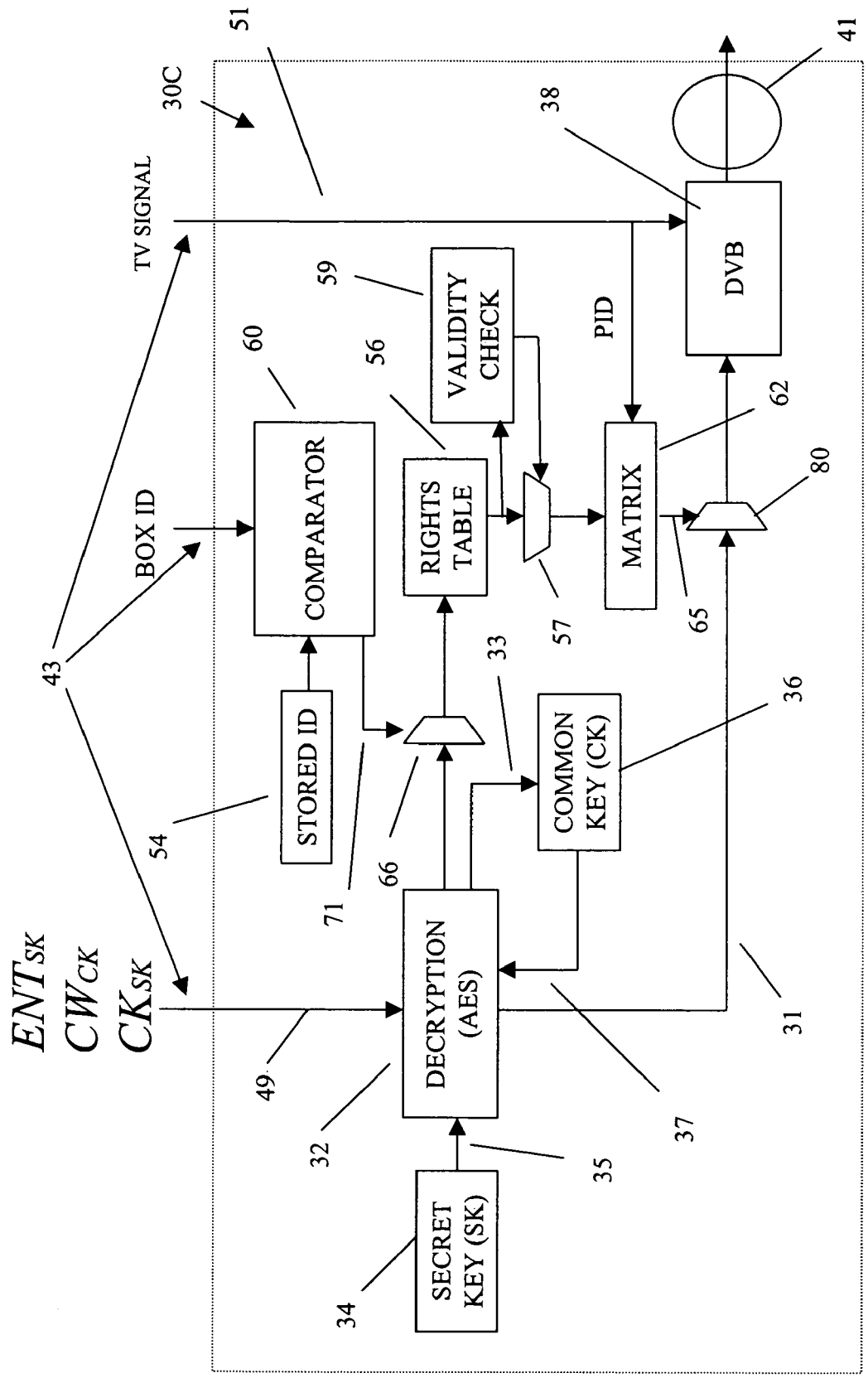
FIG. 7 shows main function components of a circuit according to a fifth embodiment of the invention.

Inhibiting production of the decrypted signals in the embodiments described is by preventing correct production by withholding the correct common key from the decryption circuit 32, unless the appropriate rights are stored. An alternative embodiment 30B is shown in FIG. 6 in which a switch 75 at the output interface 41 prevent production of the decrypted broadcast signals at the interface even if they are decrypted. The switch 75 is shown as being controlled by the matrix 62 via line 65, or in an alternative embodiment, the switch 75 is controlled directly by the comparator 60 via line 71. Another alternative embodiment 30C is shown in FIG. 7 in which a switch 80 is positioned between the decryption circuit 32 and the DVB unit 38 to prevent the control words being supplied to the DVB unit 38. Like the switch 75 of FIG. 6, the switch 80 of FIG. 7 is shown as being controlled by the matrix 62 via line 65, or in an alternative embodiment, the switch 80 is controlled directly by the comparator 60 via line 71. Switches at any of these locations or others to prevent the production of the decrypted broadcast signals or any combination of these are suitable. Such switches could be controlled by the outputs of the rights table 56, gate 57, comparator 60, matrix 62, and/or gate 64 depending on the level of security desired.

The operation of a television broadcasting system embodying the invention will now be described for completeness, highlighting the additional security provided by the system. At a broadcasting head end (such as the security computer 10 shown in FIG. 1), the viewing entitlements of each user are broadcast addressed to each user individually and identified with the stored box IDs in a stream of control data. Necessarily, due to the nature of broadcasting, all users can receive all such broadcast signals. However, only the correct authorized user can process and store the entitlements. At the set top box, the stream of control data received is extracted and passed to the circuit 30 of one embodiment of the invention. The box IDs in the stream of received data are compared to the stored box ID in the circuit and, if there is a match, the associated entitlements are decrypted using either the common key or secret key and stored in the rights store.

If there is no match of the stored box ID with any of the received IDs then the gating components prevent storage of any entitlements. Also, if the circuit 30 does not have the correct common key or secret key, then the entitlements will not be decrypted. The correct entitlements are required to allow the television signal itself to be descrambled/decrypted, and so the features of the circuit 30 described provide a secure hardware solution to preventing unauthorized users from using the circuit to decrypt television signals unless they have paid to received the appropriate entitlements.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for decryption of encrypted broadcast signals to produce decrypted broadcast signals, comprising:
    an input interface configured to receive the encrypted broadcast signals, encrypted control signals, and an entitlement message that includes a received ID and entitlement rights indicating the right of a user to receive the encrypted broadcast signals;
    an output interface configured to output the decrypted broadcast signals;
    a processing unit configured to receive the encrypted broadcast signals from the input interface, to decrypt the encrypted broadcast signals in accordance with control signals, and to provide the decrypted broadcast signals to the output interface;
    a key store configured to store a key;
    a decryption circuit arranged to receive the encrypted control signals from the input interface and to decrypt the encrypted control signals in accordance with the key from the key store;
    an ID store configured to contain a stored ID for the semiconductor integrated circuit;
    a rights store;
    a comparison circuit configured to to receive the stored ID and the received ID, to compare the received ID with the stored ID, and to cause the rights to be stored in a rights store only if the received ID and stored ID match; and
    at least one internal bus configured such that the internal bus is unconnectable-to from outside of the semiconductor integrated circuit and is arranged to carry control signals inside of the semiconductor integrated circuit to the processing unit such that the control signals are undetectable from outside of the semiconductor integrated circuit; and
    wherein the semiconductor integrated circuit is a monolithic semiconductor integrated circuit that is arranged to inhibit production of the decrypted broadcast signals if appropriate rights are not stored in the rights store.

2. A semiconductor integrated circuit according to claim 1, comprising a gating arrangement arranged to allow entitlement rights to be stored in the rights store only if the received ID and stored ID match.

3. A semiconductor integrated circuit for decryption of encrypted broadcast signals to produce decrypted broadcast signals, comprising:
    an input interface that receives the encrypted broadcast signals, encrypted control signals, and an entitlement message that includes a received ID and entitlement rights indicating the right of a user to receive the encrypted broadcast signals;
    an output interface for output of the decrypted broadcast signals;
    a processing unit arranged to receive the encrypted broadcast signals from the input interface, to decrypt the encrypted broadcast signals in accordance with control signals, and to provide the decrypted broadcast signals to the output interface;
    a key store storing a key;
    a decryption circuit arranged to receive the encrypted control signals from the input interface and to decrypt the encrypted control signals in accordance with the key from the key store;
    an ID store containing a stored ID for the circuit;
    a rights store;
    a comparison circuit arranged to receive the stored ID and the received ID, to compare the received ID with the stored ID, and to cause the rights to be stored in a rights store only if the received ID and stored ID match; and
    a gating arrangement arranged to allow entitlement rights to be stored in the rights store only if the received ID and stored ID match, wherein the gating arrangement includes an element at the output interface arranged to inhibit production of the decrypted broadcast signals by preventing the output of decrypted broadcast signals if the appropriate rights are not stored in the rights store; and
    wherein the circuit is arranged to inhibit production of the decrypted broadcast signals if appropriate rights are not stored in the rights store.

4. A semiconductor integrated circuit according to claim 2 wherein the gating arrangement includes an element at a key input to the decryption circuit arranged to inhibit production of the decrypted broadcast signals by preventing the decryption circuit receiving a key if the appropriate rights are not stored in the rights store.

5. A semiconductor integrated circuit according to claim 2 wherein the gating arrangement includes an element at an output of the decryption circuit arranged to inhibit production of the decrypted broadcast signals by preventing the processing unit from receiving the decrypted control signals if the appropriate rights are not stored in the rights store.

6. A semiconductor integrated circuit according to claim 1, wherein the entitlement message is received in an encrypted form by the decryption circuit, which decrypts the encrypted entitlement message to obtain the received ID and passes the received ID to the comparator.

7. A semiconductor integrated circuit according to claim 6 wherein the key stored in the key store is a secret key pre-stored in the key store and the entitlement message is received in encrypted form for decryption in accordance with the secret key.

8. A semiconductor integrated circuit according to claim 6 wherein the key stored in the key store is a common key received by the input interface and the entitlement message is received in encrypted form for decryption in accordance with the common key.

9. A semiconductor integrated circuit according to claim 1, wherein decryption circuit comprises a first decryption circuit arranged to decrypt the entitlement message and a second decryption circuit arranged to decrypt the control signals.

10. A semiconductor integrated circuit according to claim 1, wherein the decryption circuit is an AES circuit.

11. A semiconductor integrated circuit according to claim 1, wherein the broadcast signal is a digital television signal and the processing unit is a DVB circuit.

12. A television decoder, comprising:
a receiver configured to receive encrypted broadcast signals; and
a semiconductor integrated circuit configured to receive the encrypted broadcast signals from the receiver and configured to produce decrypted broadcast signal, the integrated circuit including:
an input interface configured to receive the encrypted broadcast signals, encrypted control signals, and an entitlement message that includes a received ID and entitlement rights indicating the right of a user to receive the encrypted broadcast signals;
an output interface configured to output the decrypted broadcast signals;
a processing unit configured to receive the encrypted broadcast signals from the input interface, to decrypt the encrypted broadcast signals in accordance with control signals, and to provide the decrypted broadcast signals to the output interface;
a key store to store a key;
a decryption circuit arranged to receive the encrypted control signals from the input interface and to decrypt the encrypted control signals in accordance with the key from the key store;
at least one internal bus configured such that the internal bus is unconnectable-to from outside of the semiconductor integrated circuit and is arranged to carry control signals inside of the semiconductor integrated circuit to the processing unit such that the control signals are undetectable from outside of the semiconductor integrated circuit;
an ID store configured to contain a stored ID for the semiconductor integrated circuit;
a rights store;
a comparison circuit arranged to receive the stored ID and the received ID, to compare the received ID with the stored ID, and to cause the rights to be stored in a rights store only if the received ID and stored ID match; and
wherein the semiconductor integrated circuit is a monolithic semiconductor integrated circuit that is arranged to inhibit production of the decrypted broadcast signals if appropriate rights are not stored in the rights store.

13. A system to broadcast signals to a plurality of subscribers in which only authorized recipients are able to decrypt the broadcast signals, comprising:
a transmitter configured to broadcast;
signals encrypted according to control words;
control words encrypted according to a common key common to all authorized recipients;
entitlement messages addressed to respective authorized recipients and containing a unique ID of each respective authorized recipient and associated entitlement rights; and
a plurality of receivers, each including a semiconductor integrated circuit that includes:
an input interface configured to receive the encrypted broadcast signals, encrypted control signals, and an entitlement message that includes a received ID and entitlement rights indicating the right of a user to receive the encrypted broadcast signals;
an output interface configured to output the decrypted broadcast signals;
a processing unit configured to receive the encrypted broadcast signals from the input interface, to decrypt the encrypted broadcast signals in accordance with control signals, and to provide the decrypted broadcast signals to the output interface;
a key store to store a key;
a decryption circuit configured to receive the encrypted control signals from the input interface and to decrypt the encrypted control signals in accordance with the key from the key store;
at least one internal bus configured such that the internal bus is unconnectable-to from outside of the semiconductor integrated circuit and is arranged to carry control signals inside of the semiconductor integrated circuit to the processing unit such that the control signals are undetectable from outside of the semiconductor integrated circuit;
an ID store configured to contain a stored ID for the semiconductor integrated circuit;
a rights store;
a comparison circuit configured to receive the stored ID and the received ID, to compare the received ID with the stored ID, and to cause the rights to be stored in a rights store only if the received ID and stored ID match; and
wherein the integrated circuit is a monolithic semiconductor integrated circuit that is arranged to inhibit production of the decrypted broadcast signals if appropriate rights are not stored in the rights store, wherein the received ID is unique to each semiconductor integrated circuit.

14. A semiconductor integrated circuit for decryption of encrypted broadcast signals to produce decrypted broadcast signals, comprising:
an input interface that receives the encrypted broadcast signals, encrypted control signals, and a received ID;
an output interface to output the decrypted broadcast signals;
a processing unit arranged to receive the encrypted broadcast signals from the input interface, to decrypt the encrypted broadcast signals in accordance with control signals, and to provide the decrypted broadcast signals to the output interface;
a decryption circuit arranged to receive the encrypted control signals from the input interface and to decrypt the encrypted control signals;
an ID store configured to contain a stored ID for the semiconductor integrated circuit;
a comparison circuit arranged to receive the stored ID and the received ID, to compare the received ID with the stored ID, and to disable the semiconductor integrated circuit if the received ID and stored ID do not match; and
at least one internal bus configured such that the internal bus is unconnectable-to from outside of the semiconductor integrated circuit and is arranged to carry control signals inside of the semiconductor integrated circuit to the processing unit such that the control signals are undetectable from outside of the semiconductor integrated circuit.

15. The integrated circuit of claim 14 wherein the decryption circuit is arranged to receive from the input interface an encrypted entitlement message that includes the received ID and entitlement rights indicating the right of a user to receive the encrypted broadcast signals and decrypt the entitlement message, the integrated circuit further comprising:
  a rights store to store the entitlement rights of the entitlement message;
  a gate element positioned between the decryption circuit and the rights store and having a control terminal connected to an output of the comparison circuit, the gate element being structured to pass the entitlement rights from the decryption circuit to the rights store only in response to receiving from the comparison circuit a control signal indicating that the received ID matches the stored ID.

16. The integrated circuit of claim 15, further comprising:
  a matrix structured to receive the entitlement rights from the rights store and a program ID from the input interface and enable the decryption circuit to decrypt the control signal depending whether the program ID indicates that the encrypted broadcast signals are within the entitlement rights and should be decrypted by the processing unit.

17. The integrated circuit of claim 14, further comprising a gate element positioned between the decryption circuit and the processing unit and structured to pass the decrypted control signals to the processing unit only if the comparator determines that the received ID matches the stored ID.

18. The integrated circuit of claim 14, further comprising:
  a key store to store a decryption key; and
  a gate element positioned between the key store and the decryption circuit and structured to pass the decryption key to the decryption circuit only if the comparator determines that the received ID matches the stored ID.

19. The integrated circuit of claim 14 wherein the decryption circuit is arranged to receive from the input interface an encrypted entitlement message that includes entitlement rights indicating the right of a user to receive the encrypted broadcast signals, the integrated circuit further comprising a key store that stores a secret key and passes the secret key to the decryption circuit which decrypts the entitlement message in accordance with the secret key.

20. The integrated circuit of claim 17 wherein the decryption circuit is structured to receive an encrypted common key from the input interface, decrypt the encrypted common key in accordance with the secret key, and decrypt the encrypted control signals in accordance with the decrypted common key.

21. A method of decrypting encrypted broadcast signals to produce decrypted broadcast signals, comprising:
  receiving the encrypted broadcast signals, encrypted control signals, and an entitlement message at an input interface of a monolithic semiconductor integrated circuit, the entitlement message includes a received ID and entitlement rights indicating the right of a user to decrypt the encrypted broadcast signals;
  decrypting the encrypted broadcast signals in accordance with control signals at the monolithic semiconductor integrated circuit;
  providing a stored key in a store key in the monolithic semiconductor integrated circuit to a decryption unit in the semiconductor integrated circuit via a bus that is unconnectable-to from outside of the monolithic semiconductor integrated circuit such that the provided key is undetectable from outside of the monolithic semiconductor integrated circuit;
  decrypting the encrypted control signals in accordance with the provided key at the monolithic semiconductor integrated circuit;
  comparing the received ID with a stored ID at the monolithic semiconductor integrated circuit;
  outputting the decrypted broadcast signals if the received ID matches the stored ID from an output interface of the monolithic semiconductor integrated circuit; and
  inhibiting output of the decrypted broadcast signals if the received ID does not match the stored ID at the monolithic semiconductor integrated circuit.

* * * * *

UNITED STATES PATENT AND TRADEMARK OFFICE
CERTIFICATE OF CORRECTION

| | |
|---|---|
| PATENT NO. | : 7,489,780 B2 |
| APPLICATION NO. | : 10/818753 |
| DATED | : February 10, 2009 |
| INVENTOR(S) | : Andrew Dellow et al. |

It is certified that error appears in the above-identified patent and that said Letters Patent is hereby corrected as shown below:

Title Page
Section (56) References Cited, under U.S. Patent Documents, a reference should be inserted to read as -- 5,941,947 A *...8/1999...Brown et al....709/225 --

Column 7
Lines 55-56, "and to cause the rights to be stored in a rights store" should read as -- and to cause the rights to be stored in the rights store, --

Column 8
Lines 30-31, "and to cause the rights to be stored in a rights store" should read as -- and to cause the rights to be stored in the rights store --

Line 47, "circuit receiving a key if the appropriate rights are not" should read as -- circuit from receiving the key if the appropriate rights are not --

Column 9
Line 18, "configured to produce decrypted broadcast signal," should read as -- configured to produce decrypted broadcast signals, --

Lines 49-50, "and to cause the rights to be stored in a rights store" should read as -- and to cause the rights to be stored in the rights store --

Line 58, "a transmitter configured to broadcast;" should read as -- a transmitter configured to broadcast: --

Line 61, "common to all authorized recipients;" should read as -- common to all authorized recipients; and --

Column 10
Lines 30-31, "and to cause the rights to be stored in a rights store" should read as -- and to cause the rights to be stored in the rights store --

Column 11
Lines 7-8, "a rights store to store the entitlement rights of the entitlement message;" should read as -- a rights store to store the entitlement rights of the entitlement message; and --

UNITED STATES PATENT AND TRADEMARK OFFICE
CERTIFICATE OF CORRECTION

PATENT NO. : 7,489,780 B2
APPLICATION NO. : 10/818753
DATED : February 10, 2009
INVENTOR(S) : Andrew Dellow et al.

It is certified that error appears in the above-identified patent and that said Letters Patent is hereby corrected as shown below:

Line 21, "signal depending whether the program ID indicates that" should read as
-- signal depending on whether the program ID indicates that --

Column 12
Line 7, "in accordance with the secret key, and decrypt the encrypted" should read as
-- in accordance with a secret key, and decrypt the encrypted --

Signed and Sealed this

Twenty-eighth Day of July, 2009

JOHN DOLL
*Acting Director of the United States Patent and Trademark Office*